United States Patent
Sugimoto et al.

(10) Patent No.: US 11,498,589 B2
(45) Date of Patent: Nov. 15, 2022

(54) VEHICLE-MOUNTED EQUIPMENT CONTROL DEVICE

(71) Applicant: Toyota Jidosha Kabushiki Kaisha, Toyota (JP)

(72) Inventors: Tsuyoshi Sugimoto, Kuwana (JP); Daigo Ishikawa, Okazaki (JP); Kazuhiko Ueda, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 16/924,465

(22) Filed: Jul. 9, 2020

(65) Prior Publication Data

US 2021/0009165 A1 Jan. 14, 2021

(30) Foreign Application Priority Data

Jul. 11, 2019 (JP) .............................. JP2019-129534

(51) Int. Cl.
*B60W 60/00* (2020.01)
*B60S 1/04* (2006.01)
(Continued)

(52) U.S. Cl.
CPC ....... *B60W 60/0053* (2020.02); *B60H 1/0073* (2019.05); *B60Q 1/143* (2013.01);
(Continued)

(58) Field of Classification Search
None
See application file for complete search history.

(56) References Cited

U.S. PATENT DOCUMENTS

| 5,865,265 A | * | 2/1999 | Matsumoto | ........... G01S 13/931 180/169 |
| 9,580,080 B1 | * | 2/2017 | Letwin | .................. B60W 50/08 |

(Continued)

FOREIGN PATENT DOCUMENTS

| DE | 102015015942 A1 | * | 9/2016 | ............. B60Q 1/143 |
| JP | 2018-024351 A | | 2/2018 | |

(Continued)

OTHER PUBLICATIONS

Translation of DE-102015015942-A1 (Fendt) obtained from Google Patents (Year: 2016).*

(Continued)

*Primary Examiner* — James J Lee
*Assistant Examiner* — Tawri M Matsushige
(74) *Attorney, Agent, or Firm* — Dinsmore & Shohl LLP

(57) ABSTRACT

A vehicle-mounted equipment control device includes a controller configured to cause equipment of any of a headlight, a wiper, and an air-conditioning device to continue a visual securing operation for securing visibility of a driver of a vehicle even after driving control of the vehicle is switched from automated driving control to manual driving control regardless of an operation mode of the equipment specified by an operation switch for setting an operation of the equipment when an operation mode executed by the equipment immediately before driving control of the vehicle is switched from automated driving control to manual driving control is an operation mode corresponding to the visual securing operation.

2 Claims, 8 Drawing Sheets

(51) Int. Cl.
  *B60W 10/30* (2006.01)
  *B60H 1/00* (2006.01)
  *B60Q 1/14* (2006.01)
  *B60W 50/14* (2020.01)

(52) U.S. Cl.
  CPC .............. *B60S 1/04* (2013.01); *B60W 10/30* (2013.01); *B60W 50/14* (2013.01); *B60Q 2300/314* (2013.01); *B60W 2420/42* (2013.01); *B60W 2510/1005* (2013.01); *B60W 2520/00* (2013.01); *B60W 2555/20* (2020.02)

(56) References Cited

U.S. PATENT DOCUMENTS

| | | | |
|---|---|---|---|
| 2006/0177098 A1* | 8/2006 | Stam | G06K 9/00791 |
| | | | 382/104 |
| 2014/0156134 A1* | 6/2014 | Cullinane | B60K 35/00 |
| | | | 701/23 |
| 2015/0019075 A1* | 1/2015 | Melcher | B60S 1/0818 |
| | | | 701/36 |
| 2019/0033860 A1 | 1/2019 | Okimoto et al. | |
| 2019/0161087 A1* | 5/2019 | Kawabe | B60W 10/04 |
| 2019/0225189 A1* | 7/2019 | Maeda | B60H 1/00785 |
| 2020/0172145 A1* | 6/2020 | Hirschfeld | B62D 1/181 |
| 2020/0196485 A1* | 6/2020 | Park | B60H 1/00021 |
| 2021/0331618 A1* | 10/2021 | Obata | B60W 60/005 |

FOREIGN PATENT DOCUMENTS

| | | |
|---|---|---|
| JP | 2018-132533 A | 8/2018 |
| JP | 2018-149934 A | 9/2018 |
| JP | 2018-177188 A | 11/2018 |

OTHER PUBLICATIONS

"Electronic visual display" Wikipedia, as edited at 17:02, Mar. 20, 2017 (Year: 2017).*

* cited by examiner

FIG. 6

| SW STATE | | MANUAL DRIVING (BEFORE AUTOMATED DRIVING) | | DURING AUTOMATED DRIVING | | | | MANUAL DRIVING (AFTER AUTOMATED DRIVING) | |
|---|---|---|---|---|---|---|---|---|---|
| | | BRIGHT | DARK | DARK | BRIGHT | DARK | DARK | BRIGHT | DARK |
| OFF | LIGHT CONTROL STATE (TURN-ON/OFF STATE) | MANUAL (OFF) | MANUAL (OFF) | AUTO (ON) | AUTO (OFF) | AUTO (ON) | AUTO (ON) | MANUAL (OFF) | MANUAL (OFF) |
| | SW STATE/CONTROL STATE (HMI DISPLAY) | MATCH | MATCH | MISMATCH (LIGHT AUTO CONTROL HAS STARTED) | | | MISMATCH (AUTO CONTROL CONTINUES) | MATCH (AUTO CONTROL IS TERMINATED) | MATCH |
| | SW OPERATION (HMI DISPLAY) | ACCEPT | ACCEPT | OFF/TAIL ARE NOT ACCEPTED (DURING LIGHT AUTO CONTROL AT PRESENT) | | | | ACCEPT | |
| TAIL | LIGHT CONTROL STATE (TURN-ON/OFF STATE) | MANUAL (TAIL) | MANUAL (TAIL) | AUTO (ON) | AUTO (OFF) | AUTO (ON) | AUTO (ON) | MANUAL (TAIL) | MANUAL (TAIL) |
| | SW STATE/CONTROL STATE (HMI DISPLAY) | MATCH | MATCH | MISMATCH (LIGHT AUTO CONTROL HAS STARTED) | | | MISMATCH (AUTO CONTROL CONTINUES) | MATCH (AUTO CONTROL IS TERMINATED) | MATCH |
| | SW OPERATION (HMI DISPLAY) | ACCEPT | ACCEPT | OFF/TAIL ARE NOT ACCEPTED (DURING LIGHT AUTO CONTROL AT PRESENT) | | | | ACCEPT | |
| AUTO | LIGHT CONTROL STATE (TURN-ON/OFF STATE) | AUTO (OFF) | AUTO (ON) | AUTO (OFF) | AUTO (OFF) | AUTO (ON) | AUTO (ON) | AUTO (OFF) | AUTO (ON) |
| | SW STATE/CONTROL STATE (HMI DISPLAY) | ACCEPT | | MATCH | | | | ACCEPT | |
| HEAD | LIGHT CONTROL STATE (TURN-ON/OFF STATE) | | | MANUAL (HEAD) | | | | | |
| | SW STATE/CONTROL STATE (HMI DISPLAY) | ACCEPT | | MATCH | | | | ACCEPT | |
| | SW OPERATION (HMI DISPLAY) | | | OFF/TAIL ARE NOT ACCEPTED (DURING LIGHT AUTO CONTROL AT PRESENT) | | | | | |

| SW STATE | | MANUAL DRIVING (BEFORE AUTOMATED DRIVING) | | DURING AUTOMATED DRIVING | | | | MANUAL DRIVING (AFTER AUTOMATED DRIVING) | | | |
|---|---|---|---|---|---|---|---|---|---|---|---|
| | | SUNNY | RAINY | RAINY AUTO (INT/Lo/Hi) | SUNNY AUTO (OFF) | RAINY AUTO (INT/Lo/Hi) | | RAINY AUTO (INT/Lo/Hi) | SUNNY MANUAL (OFF) | SUNNY MANUAL (OFF) | RAINY MANUAL (OFF) |
| OFF | WIPER CONTROL STATE (OPERATION STATE) | MANUAL (OFF) | | | | | | | | | |
| | SW STATE/CONTROL (HMI DISPLAY) | MATCH | | MISMATCH (WIPER AUTO CONTROL HAS STARTED) | | | | MISMATCH (WIPER CONTROL CONTINUES) | MATCH (WIPER CONTROL IS TERMINATED) | | |
| | SW OPERATION (HMI DISPLAY) | ACCEPT | | OFF/INT ARE NOT ACCEPTED (DURING WIPER AUTO CONTROL AT PRESENT) | | | | — | ACCEPT | | |
| INT | WIPER CONTROL STATE (OPERATION STATE) | MANUAL (INT) | | | AUTO (INT) | AUTO (INT/Lo/Hi) | | AUTO (INT/Lo/Hi) | MANUAL (INT) | | |
| | SW STATE/CONTROL (HMI DISPLAY) | MATCH | | MISMATCH (WIPER AUTO CONTROL HAS STARTED) | | | | MISMATCH (WIPER CONTROL CONTINUES) | MATCH (WIPER CONTROL IS TERMINATED) | | |
| | SW OPERATION (HMI DISPLAY) | ACCEPT | | OFF/INT ARE NOT ACCEPTED (DURING WIPER AUTO CONTROL AT PRESENT) | | | | — | ACCEPT | | |
| AUTO | WIPER CONTROL STATE (OPERATION STATE) | AUTO (OFF) | AUTO (INT/Lo/Hi) | | AUTO (OFF) | AUTO (INT/Lo/Hi) | | AUTO (INT/Lo/Hi) | MANUAL (OFF) | | |
| | SW STATE/CONTROL (HMI DISPLAY) | ACCEPT | | MATCH | | | | — | ACCEPT | | |
| | SW OPERATION (HMI DISPLAY) | | | OFF/INT ARE NOT ACCEPTED (DURING WIPER AUTO CONTROL AT PRESENT) | | | | | | | |
| Lo OR Hi | WIPER CONTROL STATE (OPERATION STATE) | | | MANUAL (Lo OR Hi) | | | | | | | |
| | SW STATE/CONTROL (HMI DISPLAY) | ACCEPT | | MATCH | | | | ACCEPT | | | |
| | SW OPERATION (HMI DISPLAY) | | | | | | | | | | |

VEHICLE-MOUNTED EQUIPMENT CONTROL DEVICE

CROSS-REFERENCE TO RELATED APPLICATIONS

This application claims priority to Japanese Patent Application No. 2019-129534 filed Jul. 11, 2019, which is incorporated herein by reference in its entirety including the specification, drawings and abstract.

FIELD

The present disclosure relates to a vehicle-mounted equipment control device that controls vehicle-mounted equipment mounted on a vehicle.

BACKGROUND

A technique of automated driving control of a vehicle has been studied. When such automated driving control is performed, vehicle-mounted equipment such as a headlight or a wiper is also controlled in accordance with a situation around a vehicle in order to facilitate accurate recognition of a situation in a traveling direction of the vehicle.

The automated driving control and manual driving control in which a driver performs driving control on a vehicle may be switched therebetween. In such a case, it is required that the vehicle-mounted equipment is controlled in such a way that the driver can appropriately drive the vehicle after the automated driving control is switched to the manual driving control. Thus, the following technique has been proposed (see Japanese Unexamined Patent Publication (Kokai) No. 2018-24351, for example). In the technique, when a driving control unit switches the driving of a vehicle from automated driving to manual driving while the automated driving control is executed and a room light turns on, light by a headlight increases for a predetermined period of time so that luminous intensity in a predetermined region illuminated by the headlight is higher than normal luminous intensity in the predetermined region illuminated by the headlight in a case where an operation of a vehicle is the manual driving.

SUMMARY

However, a driver may more easily visually recognizes surroundings of a vehicle when the automated driving control is switched to the manual driving control regardless of whether or not a room light is ON.

Thus, an object of the present disclosure is to provide a vehicle-mounted equipment control device capable of suppressing difficulty in visually recognizing surroundings of a vehicle by a driver when driving control of the vehicle is switched from the automated driving control to the manual driving control.

According to one embodiment, a vehicle-mounted equipment control device is provided. The vehicle-mounted equipment control device includes: a controller configured to cause equipment of any of a headlight, a wiper, and an air-conditioning device to continue a visual securing operation for securing visibility of a driver of a vehicle even after driving control of the vehicle is switched from automated driving control to manual driving control regardless of an operation mode of the equipment specified by an operation switch for setting an operation of the equipment when an operation mode executed by the equipment immediately before driving control of the vehicle is switched from automated driving control to manual driving control is an operation mode corresponding to the visual securing operation.

In the vehicle-mounted equipment control device, in one example, the equipment is a headlight, and the controller changes an operation mode of the headlight to an operation mode specified by the operation switch when illuminance measured by an illumination sensor installed in the vehicle is equal to or greater than a predetermined threshold value after driving control of the vehicle is switched from automated driving control to manual driving control.

In addition, in the vehicle-mounted equipment control device, in one example, the equipment is a wiper, and the controller changes an operation mode of the wiper to an operation mode specified by the operation switch when a speed of the vehicle measured by a speed sensor installed in the vehicle is equal to or less than a predetermined speed and a position of a shift lever of the vehicle is a position in which power of the vehicle is not transmitted to a wheel of the vehicle or when a rainfall amount measured by a rain sensor is equal to or less than a predetermined threshold value after driving control of the vehicle is switched from automated driving control to manual driving control.

Alternatively, in the vehicle-mounted equipment control device, in one example, the equipment is an air-conditioning device, and the controller changes an operation mode of the air-conditioning device to an operation mode specified by the operation switch when a predetermined period elapses since driving control of the vehicle is switched from automated driving control to manual driving control.

Further, in the vehicle-mounted equipment control device, in one example, the equipment is a headlight, and the controller detects an oncoming vehicle and a lighting situation of a headlight of the oncoming vehicle from each of a plurality of time-series images acquired by a camera installed in the vehicle in the latest certain period after driving control of the vehicle is switched from automated driving control to manual driving control, and changes an operation mode of the headlight to an operation mode specified by the operation switch when a ratio of the number of oncoming vehicles whose headlight is ON to a total number of detected oncoming vehicles in the certain period is equal to or less than a predetermined proportion.

Furthermore, in the vehicle-mounted equipment control device, in one example, the equipment is a wiper, and the controller detects an oncoming vehicle and an operation situation of a wiper of the oncoming vehicle from each of a plurality of time-series images acquired by a camera installed in the vehicle in the latest certain period after driving control of the vehicle is switched from automated driving control to manual driving control, and changes an operation mode of the wiper to an operation mode specified by the operation switch when a ratio of the number of oncoming vehicles whose wiper is operating to a total number of detected oncoming vehicles in the certain period is equal to or less than a predetermined proportion.

According to another embodiment, a vehicle-mounted equipment control device is provided. The vehicle-mounted equipment control device includes a controller configured to determine whether or not a set operation mode specified by an operation switch for setting an operation of equipment of any of a headlight and a wiper coincides with an execution operation mode executed by the equipment during execution of automated driving control with respect to a vehicle, and notify a driver of the vehicle that the set operation mode and the execution operation mode are different via a notification device when the set operation mode and the execution operation mode are different.

The vehicle-mounted equipment control device according to the present disclosure provides an advantageous effect capable of suppressing difficulty in visually recognizing surroundings of a vehicle by a driver when driving control of the vehicle is switched from the automated driving control to the manual driving control.

BRIEF DESCRIPTION OF DRAWINGS

FIG. 6 is a diagram illustrating one example of a relationship among a switch position of the operation switch relating to the headlight, illuminance, applied driving control, and a control state of the headlight.

FIG. 8 is a diagram illustrating one example of a relationship among a switch position of the operation switch relating to the wiper, a rainfall amount, applied driving control, and a control state of the wiper.

DESCRIPTION OF EMBODIMENTS

A vehicle-mounted equipment control device will be described below with reference to the drawings. The vehicle-mounted equipment control device controls at least any of a headlight, a wiper, and an air-conditioning device (hereinafter may be referred to as vehicle-mounted equipment or controlled equipment). Then, in a case where the controlled equipment performs an operation for securing visibility of a driver (hereinafter referred to as a visibility securing operation) during automated driving control, even when the automated driving control is switched to manual driving control, the vehicle-mounted equipment control device continues the visibility securing operation regardless of an operation mode of the controlled equipment specified by an operation unit corresponding to the controlled equipment. In this way, the vehicle-mounted equipment control device prevents that the driver cannot visually recognize surroundings of a vehicle when the automated driving control is switched to the manual driving control.

Note that the visual securing operation is, for example, an operation of illuminating a front region of a vehicle by lighting for a headlight, is an operation of wiping a windshield for a wiper, and is a defroster operation of removing fogging of the windshield for an air-conditioning device. Further, continuation of the visual securing operation includes maintaining an execution level of the visibility securing operation during the automated driving control without a decrease in the execution level. For example, when the wiper operates at a low speed during the automated driving control, the vehicle-mounted equipment control device may maintain a low-speed operation of the wiper even in a case where an operation mode specified by the operation unit is a mode of intermittently operating the wiper. Furthermore, when an operation mode of the controlled equipment specified by the operation unit is different from an operation mode different from the visibility securing operation in a case where automatic control causes the controlled equipment to perform the visibility securing operation, the vehicle-mounted equipment control device notifies a driver that the operation mode of the controlled equipment under execution and the operation mode specified by the operation unit do not coincide with each other via a human machine interface.

Figure 1:
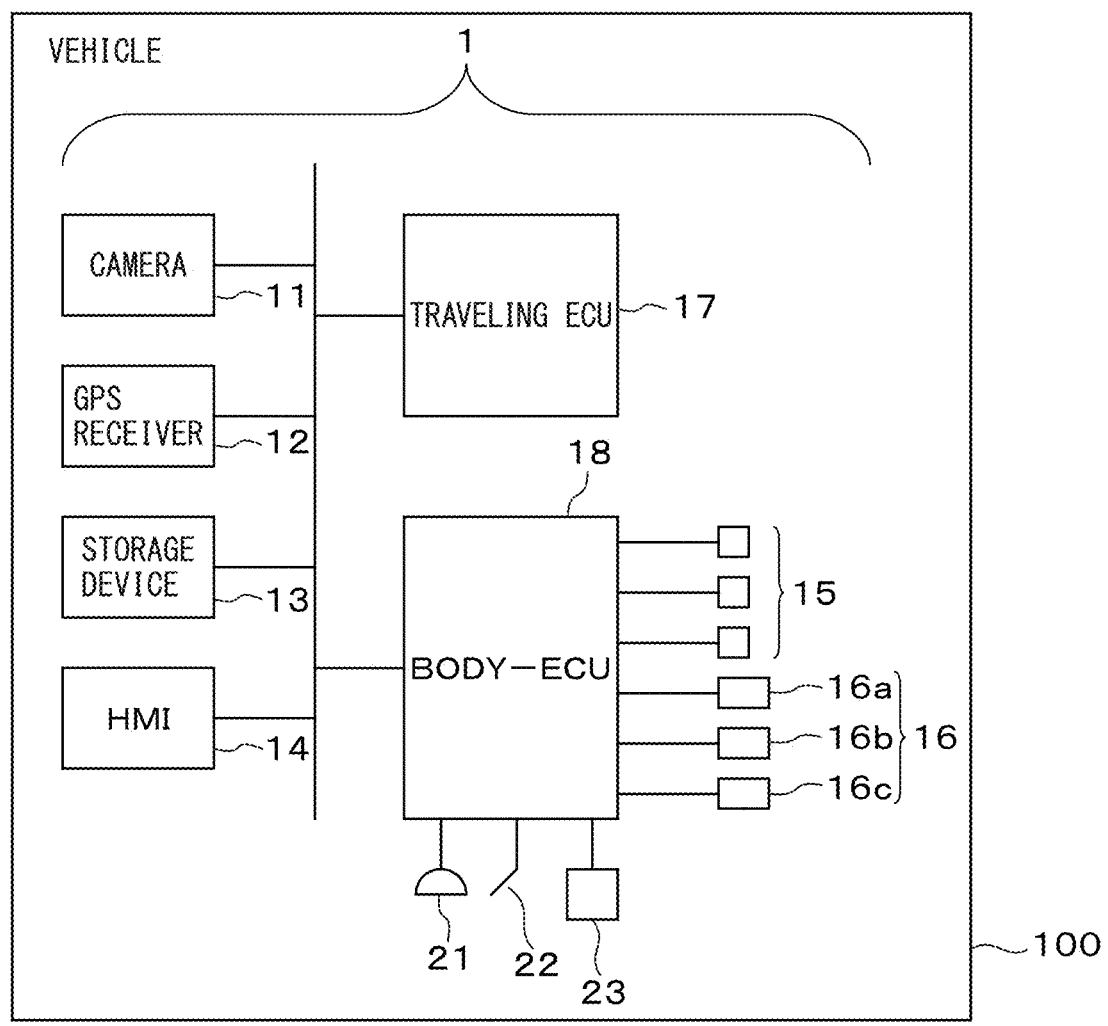
FIG. 1 is a schematic configuration diagram of a vehicle control system in which a vehicle-mounted equipment control device is installed.

FIG. 1 is a schematic configuration diagram of a vehicle control system in which a vehicle-mounted equipment control device is installed. In the present embodiment, a vehicle control system 1 that is installed in a vehicle 100 and controls the vehicle 100 includes a camera 11, a GPS receiver 12, a storage device 13, a human machine interface (hereinafter referred to as an HMI) 14, at least one sensor 15, an operation switch 16, a traveling control electronic control unit (hereinafter referred to as a traveling ECU) 17, and a vehicle body control electronic control unit (hereinafter referred to as a BODY-ECU) 18. The camera 11, the GPS receiver 12, the storage device 13, the HMI 14, the traveling ECU 17, and the BODY-ECU 18 are communicatively connected to one another via an in-vehicle network conforming to a standard such as the Controller Area Network. Further, the sensor 15 and the operation switch 16 are connected to each other via the BODY-ECU 18 via a signal line. Further, the BODY-ECU 18 is connected to a headlight 21, a wiper 22, and an air-conditioning device 23 via a signal line. The vehicle control system 1 may further includes an object detection sensor for detecting an object around the vehicle 100, such as a LiDAR sensor or a radar, and a wireless communication device for communicating with out-of-vehicle equipment. Still further, the vehicle 100 may include a receiver conforming to another satellite measurement system instead of the GPS receiver 12.

The camera 11 is one example of an imaging unit, and includes a two-dimensional detector configured with an array of photoelectric conversion elements having sensitivity to visible light, such as a CCD or a C-MOS, and an imaging optical system that forms an image of a region to be imaged on the two-dimensional detector. Then, the camera 11 is mounted, for example, inside a vehicle of the vehicle 100 in such a way that it is oriented in a forward direction of the vehicle 100. Then, the camera 11 captures a forward region of the vehicle 100 at every predetermined imaging period (e.g., 1/30 seconds to 1/10 seconds), and generates an image representing the forward region. The image generated by the camera 11 may be a color image or a gray image. Note that a plurality of cameras having different imaging directions or different focal distances may be provided in the vehicle 100.

Every time the camera 11 generates an image, the camera 11 outputs the generated image to the traveling ECU 17 via the in-vehicle network.

The GPS receiver 12 receives a GPS signal from a global positioning system (GPS) satellite at every predetermined period, and measures a self-position of the vehicle 100 on the basis of the received GPS signal. Then, the GPS receiver 12 outputs the measurement result of the self-position of the vehicle 100 on the basis of the GPS signal at every predetermined period to the traveling ECU 17 via the in-vehicle network. Note that, when the vehicle 100 includes a receiver conforming to a satellite measurement system other than the GPS receiver 12, the receiver may measure a self-position of the vehicle 100.

The storage device 13 includes, for example, a hard disk device or a non-volatile semiconductor memory. Then, the storage device 13 stores map information. The map information includes, for each predetermined section of a road, a position in the section and information representing a road marking such as a lane division line or a stop line and information representing a road sign in the section. Then, the storage device 13 reads the map information in accordance with a request for reading the map information from the traveling ECU 17, and passes the map information to the traveling ECU 17 via the in-vehicle network.

The HMI 14 is one example of a notification unit, and notifies a driver of the vehicle 100 of notification information received from the traveling ECU 17 or the BODY-ECU 18. For this purpose, the HMI 14 includes, for example, a display device such as a liquid crystal display, a meter such as a speedometer, a warning light, a speaker, and the like, and is provided so as to be oriented toward the driver inside the vehicle of the vehicle 100, e.g., in an instrumental panel. Then, for example, when the automated driving control is performed on the vehicle 100 and an operation mode being performed on any of the headlight 21, the wiper 22, and the air-conditioning device 23 and an operation mode specified by a switch for operating any of them are different, the HMI 14 notifies the driver of this matter.

The sensor 15 measures a physical parameter representing an environment outside the vehicle or an environment inside the vehicle relating to a degree to which the camera 11 and the driver can visually recognize surroundings of the vehicle 100. For example, the sensor 15 includes at least any of an illumination sensor for measuring luminance (illuminance) around the vehicle 100, a rain sensor for measuring a rainfall amount around the vehicle 100, a thermometer for measuring a temperature around the vehicle 100, and a thermometer for measuring a temperature inside the vehicle. Then, every time the sensor 15 measures the physical parameter (illuminance, a rainfall amount, a temperature and etc.) to obtain a measurement value of the physical parameter, the sensor 15 outputs the measurement value to the BODY-ECU 18. For example, when the BODY-ECU 18 automatically set an operation of vehicle-mounted equipment such as the headlight 21, the wiper 22, and the air-conditioning device 23, the measurement value is used for determining whether or not the BODY-ECU 18 causes the vehicle-mounted equipment to perform the visibility securing operation.

The operation switch 16 is one example of an operation unit, and is used for the driver to specify an operation mode applied to the headlight 21, the wiper 22, and the air-conditioning device 23. In the present embodiment, the operation switch 16 includes an operation switch 16a for operating the headlight 21, an operation switch 16b for operating the wiper 22, and an operation switch 16c for controlling the air-conditioning device 23. The operation switch 16a for operating the headlight 21 is provided on, for example, a rear side and a right side of a steering wheel seen from the driver. Further, the operation switch 16b for operating the wiper 22 is provided on, for example, the rear side and a left side of the steering wheel seen from the driver. Furthermore, the operation switch 16c for operating the air-conditioning device 23 is provided in an instrumental panel between a driver's seat and a passenger's seat, for example.

The operation switches 16a to 16c are each provided with a plurality of switch positions that specify different operation modes.

Figure 2:
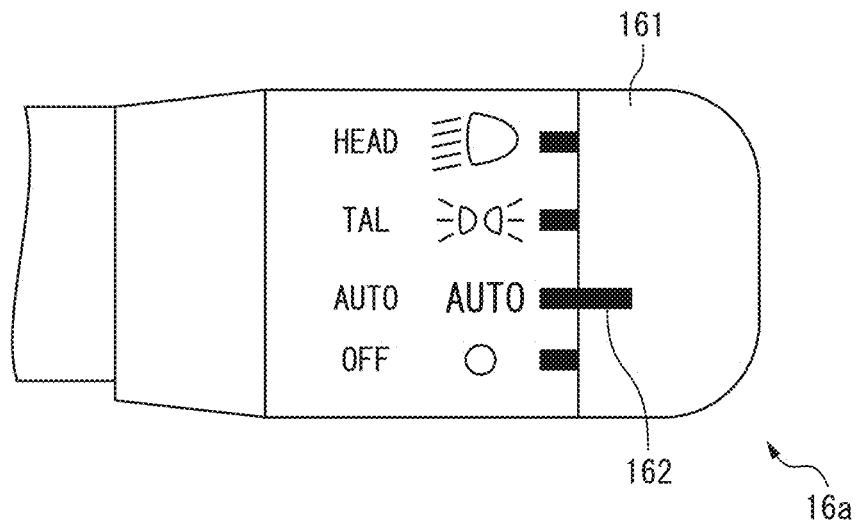
FIG. 2 is an explanatory diagram of a switch position of an operation switch for operating a headlight.

FIG. 2 is an explanatory diagram of a switch position of the operation switch 16a for operating the headlight 21. For example, in the operation switch 16a, a HEAD position, a TAIL position, an AUTO position, and an OFF position are provided as switch positions. The HEAD position is a switch position that specifies an operation mode of compulsorily turning on the headlight 21 and a tail lamp. The TAIL position is a switch position that specifies an operation mode of turning on the tail lamp without turning on the headlight 21. The AUTO position is a switch position that specifies an operation mode of performing control in such a way as to automatically turn on or turn off the headlight and the tail lamp of the vehicle 100 in accordance with illuminance around the vehicle 100 being measured by the illumination sensor. Then, the OFF position is a switch position that specifies an operation mode of turning off both of the headlight 21 and the tail lamp. Then, the driver matches a mark 162 of an indication member 161 provided in such a way as to be rotatable about an axis of the operation switch 16a at a tip of the operation switch 16a with any of the switch positions, and thus every time the switch position is changed, the operation switch 16a outputs an operation signal representing the operation mode in accordance with the switch position.

Furthermore, the operation switch 16a may be able to set a direction (such as upward and downward) of light distribution of the headlight 21. Still further, the operation switch 16a may be able to set an application of automatic orientation control of the headlight 21.

Figure 3:
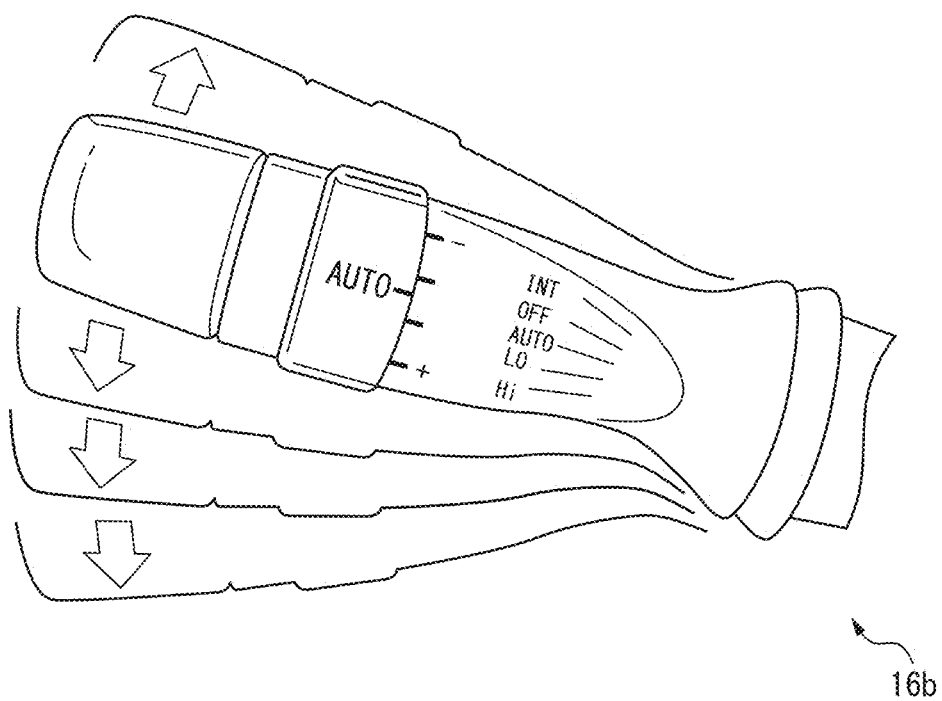
FIG. 3 is an explanatory diagram of a switch position of an operation switch for operating a wiper.

FIG. 3 is an explanatory diagram of a switch position of the operation switch 16b for operating the wiper 22. For example, in the operation switch 16b, an INT position, an OFF position, an AUTO position, a Lo position, and a Hi position are provided as switch positions in order from the top. The AUTO position is a switch position that specifies an operation mode of automatically determining whether or not to cause the wiper 22 to perform an operation of wiping the windshield of the vehicle 100 (hereinafter simply referred to as an operation), and automatically adjusting an operation speed of the wiper 22. The Hi position is a switch position that specifies an operation mode of operating the wiper 22 at a relatively fast speed. The Lo position is a switch position that specifies an operation mode of operating the wiper 22 at a relatively slow speed. The INT position is a switch position that specifies an operation mode of intermittently operating the wiper 22. Then, the OFF position is a switch position that specifies an operation mode of stopping the wiper 22. Furthermore, the operation switch 16b may be able to adjust an operation interval of the wiper 22 when the switch position is the INT position. Then, the driver moves the operation switch 16b up or down, and thus the switch position of the operation switch 16b changes. Every time the switch position is changed, the operation switch 16b outputs an operation signal representing the operation mode in accordance with the switch position.

Furthermore, in the operation switch 16c for operating the air-conditioning device 23, for example, a defroster switch capable of switching whether or not to cause the air-conditioning device 23 to compulsorily perform the defroster operation, and a mode switching switch that switches whether or not to apply the AUTO mode of automatically controlling the air-conditioning device 23 in such a way that a temperature inside the vehicle of the vehicle 100 becomes a set temperature are provided. Then, every time the switch position of the defroster switch or the switch position of the mode switching switch is changed by the driver, the operation switch 16c outputs an operation signal representing the operation mode in accordance with the switch position.

The traveling ECU 17 performs control relating to traveling of the vehicle 100. For this purpose, the traveling ECU 17 includes, for example, one or a plurality of processors, a memory, and a communication interface. In the present embodiment, the traveling ECU 17 switches the vehicle 100 between the automated driving control and the manual driving control. For example, the traveling ECU 17 switches from the manual driving control to the automated driving control when the vehicle 100 enters a section in which the automated driving control is allowed and is represented in map information. On the contrary, the traveling ECU 17 switches from the automated driving control to the manual driving control when the vehicle 100 goes out of the section in which the automated driving control is allowed. Note that the traveling ECU 17 may determine whether or not the vehicle 100 is included in the section in which the automated driving control is allowed on the basis of map information and positioning information by the GPS receiver 12 or its own position of the vehicle 100 which is estimated by matching a feature such as a lane division line represented in the map information with a feature represented in an image generated by the camera 11. Further, in a case where the automated driving control is applied, when the automated driving control is turned off by operating a switch capable of switching between ON and OFF of the automated driving control (not illustrated) by the driver, the traveling ECU 17 switches from the automated driving control to the manual driving control. The traveling ECU 17 performs, for example, the automated driving control on the vehicle 100 in such a way that the vehicle 100 travels along a traveling route set by a navigation system (not illustrated) while the automated driving control is applied. At this time, the traveling ECU 17 detects an object around the vehicle 100 from a time-series of images acquired by the camera 11, predicts a track of the detected object, and sets a trajectory of the vehicle 100 in such a way that the vehicle 100 does not collide with the object. Then, the traveling ECU 17 determines a control amount such as an accelerator opening, a steering angle of a steering wheel, or a brake amount in such a way that the vehicle 100 travels along the trajectory, and controls an actuator that controls an accelerator, a steering wheel, a brake, or the like in accordance with the control amount. Furthermore, when the automated driving control is switched to the manual driving control or when the manual driving control is switched to the automated driving control, the traveling ECU 17 notifies the driver that the switching is performed via the HMI 14, and transmits a signal representing a type of driving control (automatic or manual) applied after the switching to the BODY-ECU 18.

Still further, when receiving, via the in-vehicle network from the BODY-ECU 18, a signal representing that an operation mode according to the switch position of the operation switch 16 (set operation mode) and an operation mode of corresponding vehicle-mounted equipment under execution (execution operation mode) are different from each other, the traveling ECU 17 notifies the driver that the set operation mode and the execution operation mode are different from each other via the HMI 14. For example, the traveling ECU 17 causes a display device included in the HMI 14 to display a message representing that the set operation mode and the execution operation mode are different, or causes a speaker included in the HMI 14 to output the message as a voice. Similarly, when receiving, via the in-vehicle network from the BODY-ECU 18, a signal representing that the visibility securing operation continues after switching to the manual driving control or that continuation of the visibility securing operation is terminated, the traveling ECU 17 notifies the driver of the matter via the HMI 14.

The BODY-ECU 18 is one example of the vehicle-mounted equipment control device, and controls vehicle-mounted equipment such as the headlight 21, the wiper 22, and the air-conditioning device 23.

Figure 4:
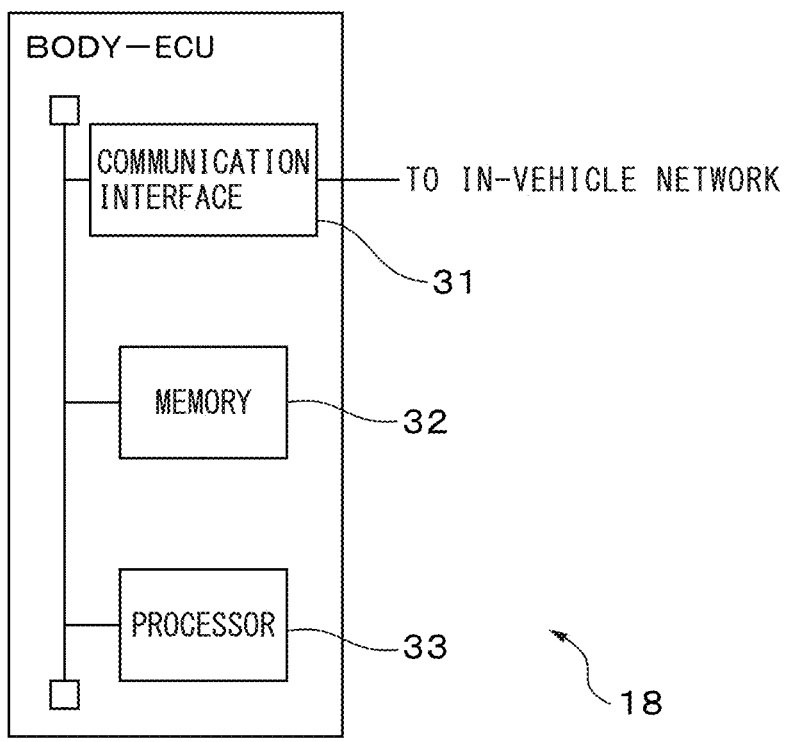
FIG. 4 is a hardware configuration diagram of a BODY-ECU being one embodiment of the vehicle-mounted equipment control device.

FIG. 4 is a hardware configuration diagram of the BODY-ECU 18 according to an embodiment of the vehicle-mounted equipment control device. The BODY-ECU 18 includes a communication interface 31, a memory 32, and a processor 33. Note that the communication interface 31, the memory 32, and the processor 33 may be different circuits or may be configured as one integrated circuit.

The communication interface 31 is one example of an in-vehicle communication unit, and includes a communication interface circuit for connecting the BODY-ECU 18 to the in-vehicle network and an interface circuit that can receive a signal from the sensor 15 or the operation switch 16 or output a control signal to the headlight 21, the wiper 22, or the air-conditioning device 23. Then, when receiving a signal representing a type of applied driving control from the traveling ECU 17 via the in-vehicle network, the communication interface 31 passes the signal to the processor 33. Furthermore, every time the communication interface 31 receives a signal representing a measurement value such as illuminance, a rainfall amount, or a temperature from the sensor 15, the communication interface 31 passes the signal to the processor 33. Furthermore, every time the communication interface 31 receives a signal representing an operation mode specified by the operation switch 16, the communication interface 31 passes the signal to the processor 33.

Further, when receiving a signal representing a matter to be notified to the driver, such as, for any vehicle-mounted equipment from the processor 33, a set operation mode and an execution operation mode are different and the like, the communication interface 31 outputs the signal to the traveling ECU 17 via the in-vehicle network. Furthermore, when receiving a control signal to any vehicle-mounted equipment from the processor 33, the communication interface 31 outputs the control signal to the vehicle-mounted equipment.

The memory 32 is one example of a storage unit, and includes, for example, a volatile semiconductor memory and a non-volatile semiconductor memory. Then, the memory 32 stores a program of vehicle-mounted equipment control processing (including processing of determining termination of a visibility securing operation) executed by the processor 33 of the BODY-ECU 18, various kinds of data used in the vehicle-mounted equipment control processing, a measurement value of the physical parameter, and the like.

The processor 33 is one example of a control unit, and includes one or a plurality of central processing units (CPUs) and peripheral circuits thereof. The processor 33 may further include another arithmetic circuit such as a logical arithmetic unit or a numerical arithmetic unit. Then, the processor 33 executes the vehicle-mounted equipment control processing to control the headlight 21, the wiper 22, and the air-conditioning device 23.

The processor 33 controls the headlight 21, the wiper 22, and the air-conditioning device 23 in accordance with an operation mode specified by the operation switches 16a to 16c while the traveling ECU 17 performs the manual driving control. Further, the processor 33 automatically determines whether or not to cause the headlight 21, the wiper 22, and the air-conditioning device 23 to perform the visibility securing operation according to a measurement value of the physical parameter by the sensor 15 while the traveling ECU 17 performs the automated driving control. Note that, when any of the operation switches 16a to 16c specifies an operation mode of causing corresponding controlled equipment to perform the visibility securing operation, the processor 33 may cause the corresponding controlled equipment to perform the visibility securing operation. Further, in a case where the controlled equipment of any of the headlight 21, the wiper 22, and the air-conditioning device 23 is performing the visual securing operation when the automated driving control is switched to the manual driving control, that is, when the traveling ECU 17 notifies that the manual driving control is applied during execution of the automated driving control, the processor 33 causes the controlled equipment to continue the visibility securing operation regardless of an operation mode specified by the operation switch corresponding to the controlled equipment.

Figure 5:
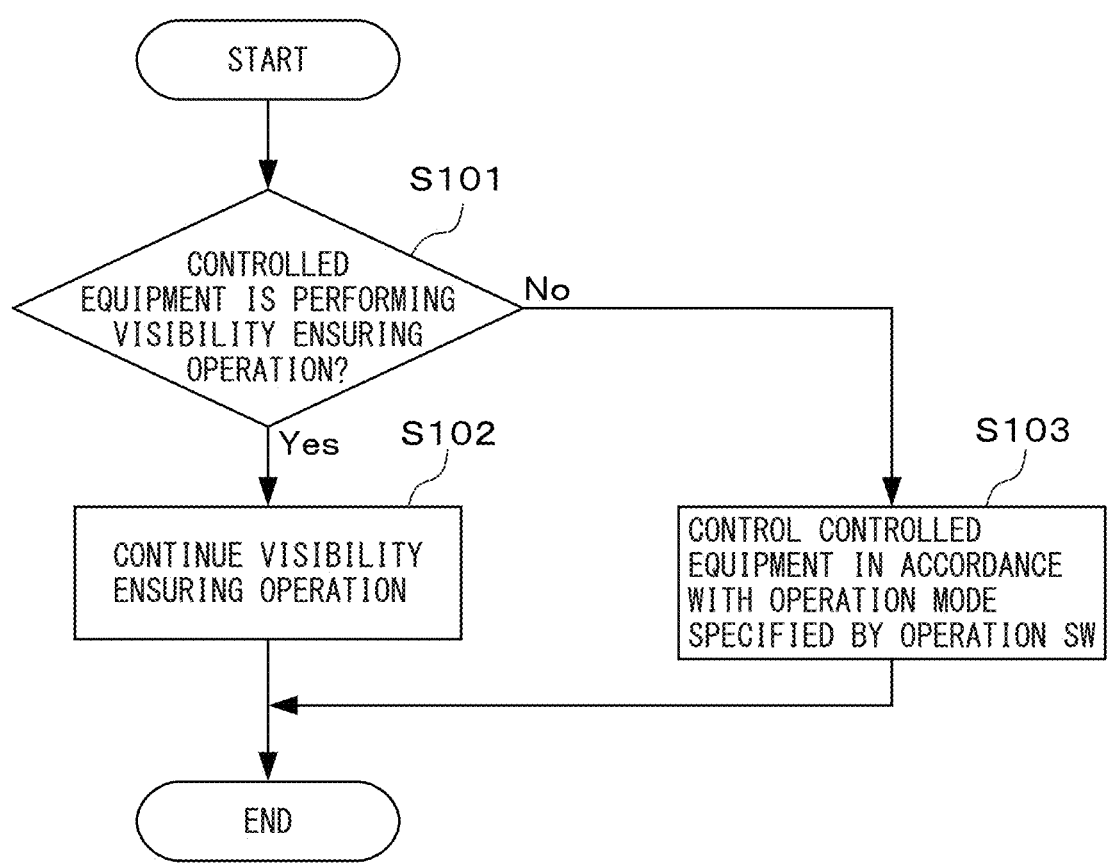
FIG. 5 is an operation flowchart of vehicle-mounted equipment control processing when automated driving control is switched to manual driving control.

FIG. 5 is an operation flowchart of the vehicle-mounted equipment control processing when the automated driving control is switched to the manual driving control. When the processor 33 is notified that the manual driving control is applied from the traveling ECU 17 during the application of the automated driving control, the processor 33 controls each of the headlight 21, the wiper 22, and the air-conditioning device 23 in accordance with the following operation flowchart.

When the processor 33 is notified that the manual driving control is applied from the traveling ECU 17 during the application of the automated driving control, the processor 33 determines whether or not the controlled equipment (the headlight 21, the wiper 22, and the air-conditioning device 23) is performing the visibility securing operation (step S101). When the controlled equipment is performing the visibility securing operation (step S101—Yes), the processor 33 controls the controlled equipment in such a way that the controlled equipment continues the visibility securing operation (step S102).

On the other hand, when the controlled equipment is not performing the visibility securing operation (step S101—No), the processor 33 controls the controlled equipment in accordance with an operation mode according to a switch position set for an operation switch corresponding to the controlled equipment (step S103).

After step S102 or S103, the processor 33 terminates the vehicle-mounted equipment control processing.

Note that, when a predetermined condition is satisfied for the controlled equipment that continues the visibility securing operation after the automated driving control is switched to the manual driving control, the processor 33 terminates continuation of the visibility securing operation.

Details of control of the headlight 21 will be described below.

FIG. 6 is a diagram illustrating one example of a relationship among a switch position of the operation switch 16a relating to the headlight 21, illuminance, applied driving control, and a control state of the headlight 21. In a table 600 illustrated in FIG. 6, a lighting state of the headlight 21, a match or a mismatch of an operation mode, and whether or not to enable acceptance of an operation of the operation switch 16a in each of cases where a set switch position is the OFF position, is the TAIL position, is the AUTO position, and is the HEAD position are illustrated in order from the top. Further, a lighting state of the headlight 21, a match or a mismatch of an operation mode, and whether or not to enable acceptance of an operation of the operation switch 16 in a case where the manual driving control is applied (before the automated driving control), in a case where the automated driving control is applied, and immediately after the automated driving control is switched to the manual driving control, are illustrated in order from the left.

In the present embodiment, the processor 33 automatically determines whether or not to turn on an illumination lamp of the vehicle 100, such as the headlight 21, on the basis of a measurement value of illuminance while the traveling ECU 17 performs the automated driving control, similarly to when the switch position of the operation switch 16a is set to the AUTO position. For example, the processor 33 turns off the headlight 21 and turns on the tail lamp when the illuminance is equal to or greater than a first illuminance threshold value and is less than a second illuminance threshold value higher than the first illuminance threshold value. Further, the processor 33 turns on the headlight 21 and the tail lamp when the illuminance is less than the first illuminance threshold value. Furthermore, the processor 33 turns off the headlight 21 and the tail lamp when the illuminance is equal to or greater than the second illuminance threshold value. However, when the switch position of the operation switch 16a is the HEAD position, the processor 33 may turn on the headlight 21 and the tail lamp regardless of a measurement value of the illuminance.

Further, the processor 33 controls an illumination lamp such as the headlight 21 in accordance with an operation mode according to a switch position set for the operation switch 16a while the traveling ECU 17 performs the manual driving control.

In the present embodiment, when the applied driving control is switched from the automated driving control to the manual driving control in a case where the visual securing operation is performed during the previous automated driving control, i.e., when the processor 33 is notified that the manual driving control is applied from the traveling ECU 17 during execution of the automated driving control, the processor 33 controls the headlight 21 in such a way that the visibility securing operation continues even after switching to the manual driving control regardless of a switch position of the operation switch 16a. For example, when the headlight 21 is ON during execution of the previous automated driving control, the processor 33 continues lighting of the headlight 21 even when the switch position of the operation switch 16a is the OFF position or the TAIL position.

When the visibility securing operation of the headlight 21 continues even after switching to the manual driving control, the processor 33 determines whether or not to terminate continuation of the visibility securing operation on the basis of a measurement value of illuminance, for example.

Figure 7:
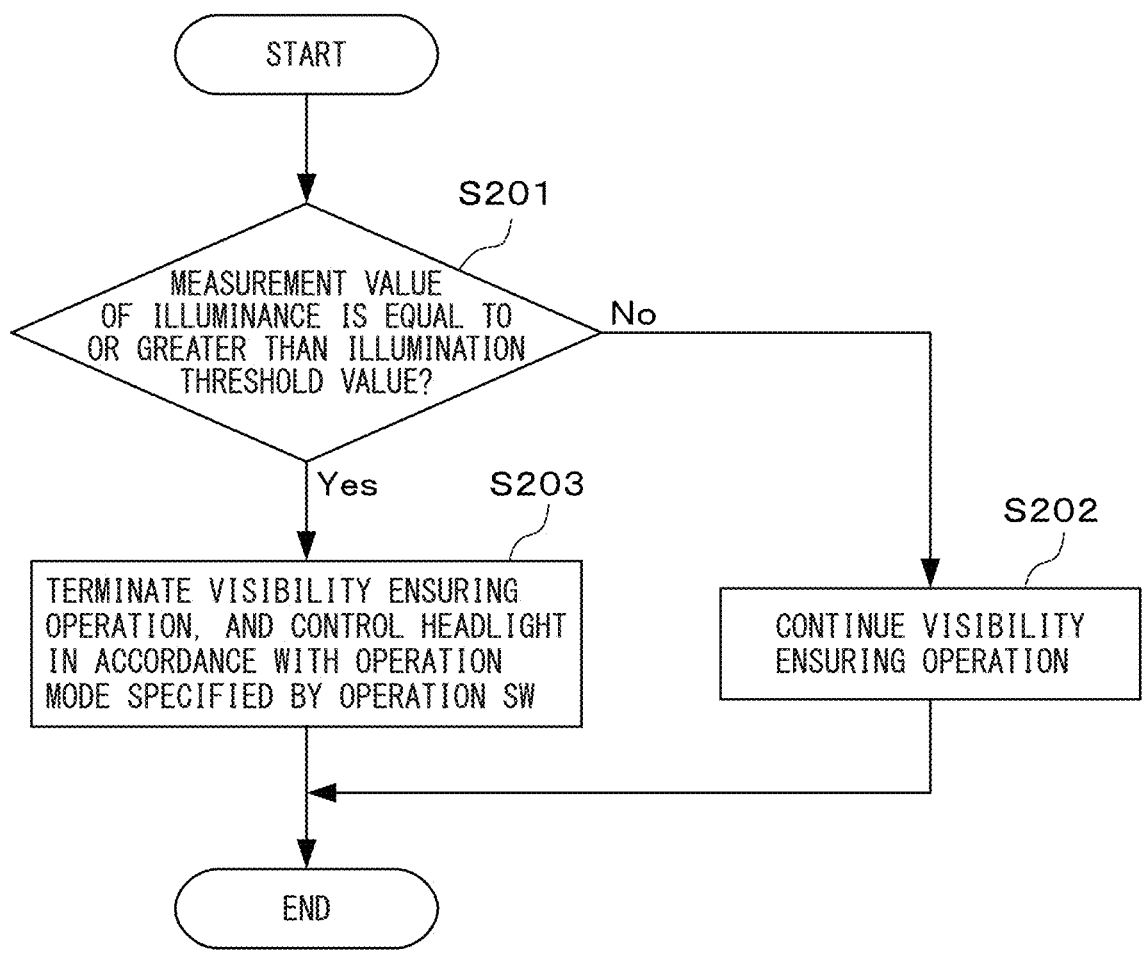
FIG. 7 is an operation flowchart of processing of determining termination of a visibility securing operation relating to the headlight.

FIG. 7 is an operation flowchart of the processing of determining termination of a visibility securing operation relating to the headlight 21. When the headlight 21 continues the visibility securing operation after the automated driving control is switched to the manual driving control, the processor 33 determines whether or not to terminate the visibility securing operation in accordance with the following operation flowchart at every predetermined period.

The processor 33 determines whether or not a measurement value of illuminance is equal to or greater than a predetermined illuminance threshold value (step S201).

When the measurement value of the illuminance is less than the predetermined illuminance threshold value (step S201—No), the processor 33 causes the headlight 21 to continue the visibility securing operation (step S202). In other words, the processor 33 maintains the state where the headlight 21 remains ON. On the other hand, when the measurement value of the illuminance is equal to or greater than the predetermined illuminance threshold value (step S201—Yes), i.e., when brightness around the vehicle 100 is enough brightness without lighting of the headlight 21, the processor 33 turns off the headlight 21 and terminates the visibility securing operation. Then, the processor 33 controls the headlight 21 in accordance with an operation mode specified by the operation switch 16a (step S203). After step S202 or S203, the processor 33 terminates the processing of determining termination of a visibility securing operation. Note that the predetermined illuminance threshold value can be, for example, the first illuminance threshold value or the second illuminance threshold value described above.

According to a modification example, the processor 33 may terminate continuation of the visibility securing operation of the headlight 21 after a lapse of a predetermined period from timing at which the automated driving control is switched to the manual driving control. Alternatively, when an operation mode according to a switch position of the operation switch 16a by an operation of the operation switch 16a by the driver coincides with an operation mode of the headlight 21 under execution, the processor 33 may terminate continuation of the visibility securing operation of the headlight 21.

According to another modification example, in a case where the headlight 21 continues the visibility securing operation after switching to the manual driving control, the processor 33 may terminate continuation of the visibility securing operation of the headlight 21 when the processor 33 is notified, from the traveling ECU 17, that a vehicle speed of the vehicle 100 is equal to or less than a predetermined speed threshold value and a shift position of a shift lever is a shift position in which power of the vehicle 100 is not transmitted to a wheel. Note that the shift position in which the power of the vehicle 100 is not transmitted to the wheel is, for example, a neutral position or a parking position. Further, the predetermined speed threshold value can be, for example, 5 km/h. Alternatively, when the processor 33 is notified that an ignition switch is turned off from the traveling ECU 17, the processor 33 may terminate continuation of the visibility securing operation of the headlight 21.

The processor 33 may control the headlight 21 in accordance with an operation mode according to a switch position set for the operation switch 16a after the continuation of the visibility securing operation is terminated.

Note that, when the driver operates an operation switch that sets a direction of light distribution of the headlight 21 (not illustrated) during execution of the automated driving control, the processor 33 may store a flag representing the direction of light distribution specified according to the operation in the memory 32. Then, the processor 33 may refer to the flag after switching to the manual driving control, and control the headlight 21 in such a way as to set the direction of light distribution according to the operation.

Next, details of control of the wiper 22 will be described. FIG. 8 is a diagram illustrating one example of a relationship among a switch position of the operation switch 16 relating to the wiper 22, a rainfall amount, applied driving control, and a control state of the wiper 22. In a table 800 illustrated in FIG. 8, an operation state of the wiper 22, a match or a mismatch of an operation mode, and whether or not to enable acceptance of an operation of the operation switch 16b in each of cases where a switch position is the OFF position, is the INT position, is the AUTO position, is the Lo position or the Hi position are illustrated in order from the top. Further, an operation state of the wiper 22, a match or a mismatch of an operation mode, and whether or not to enable acceptance of an operation of the operation switch 16b in a case where the manual driving control is applied (before the automated driving control), in a case where the automated driving control is applied, and immediately after the automated driving control is switched to the manual driving control are illustrated in order from the left.

In the present embodiment, the processor 33 controls the wiper 22 on the basis of a rainfall amount measured by the rain sensor, similarly to when the switch position of the operation switch 16b is set to the AUTO position while the traveling ECU 17 performs the automated driving control. For example, the processor 33 stops the operation of the wiper 22 when a measurement value of the rainfall amount is less than a first rainfall amount threshold value. Further, the processor 33 intermittently operates the wiper 22 when the measurement value of the rainfall amount is equal to or greater than the first rainfall amount threshold value and is also less than a second rainfall amount threshold value higher than the first rainfall amount threshold value. Further, the processor 33 operates the wiper 22 at a relatively slow speed (namely, at a speed when the switch position is set to the Lo position) when the measurement value of the rainfall amount is equal to or greater than the second rainfall amount threshold value and is less than a third rainfall amount threshold value higher than the second rainfall amount threshold value. Furthermore, the processor 33 operates the wiper 22 at a relatively fast speed (i.e., at a speed when the switch position is set to the Hi position) when the measurement value of the rainfall amount is equal to or greater than the third rainfall amount threshold value. However, when the switch position of the operation switch 16b is the Hi position or the Lo position, the processor 33 may operate the wiper 22 at a speed in accordance with the set switch position regardless of a measurement value of the rainfall amount.

Further, the processor 33 controls the wiper 22 in accordance with an operation mode according to a switch position of the operation switch 16b while the traveling ECU 17 performs the manual driving control.

However, in the present embodiment, in a case where the wiper 22 performs the visual securing operation during the previous automated driving control when the applied driving control is switched from the automated driving control to the manual driving control, i.e., when the processor 33 is notified that the manual driving control is applied from the traveling ECU 17 during execution of the automated driving control, the processor 33 controls the wiper 22 in such a way that the visibility securing operation continues regardless of a switch position of the operation switch 16b. For example, when the wiper 22 performs an operation corresponding to any of the Hi position, the Lo position, and the INT position during execution of the previous automated driving control, the processor 33 causes the wiper 22 to continue the operation. Note that, when a switch position is set to the AUTO position, the Hi position, or the Lo position, the processor 33 may operate the wiper 22 in accordance with the switch position immediately after the automated driving control is switched to the manual driving control.

When the visibility securing operation of the wiper 22 continues even after switching to the manual driving control, the processor 33 determines whether or not to terminate continuation of the visibility securing operation on the basis of a measurement value of the rainfall amount, the vehicle speed, and the like, for example.

Figure 9:
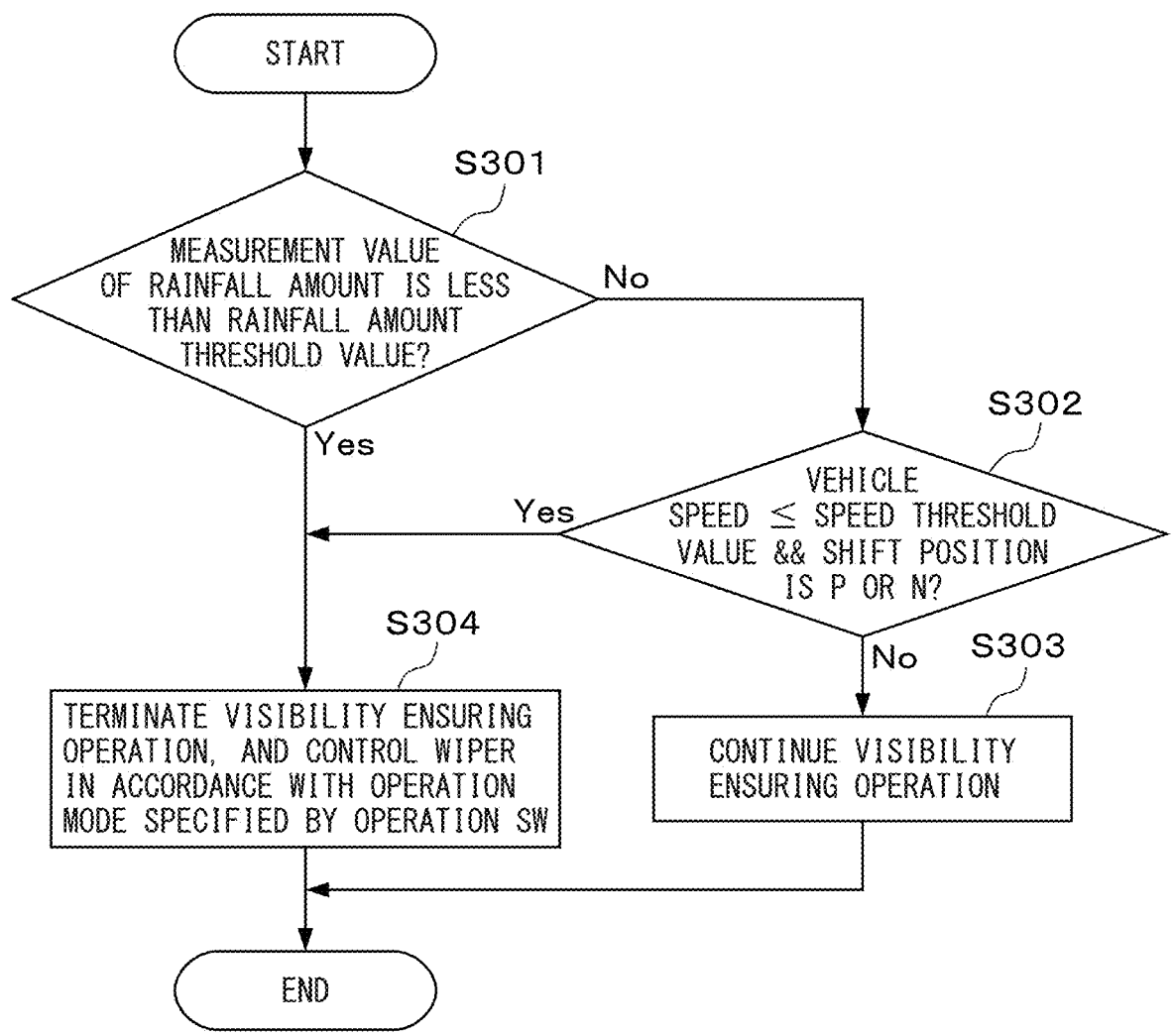
FIG. 9 is an operation flowchart of processing of determining termination of a visibility securing operation relating to the wiper.

FIG. 9 is an operation flowchart of the processing of determining termination of a visibility securing operation relating to the wiper 22. When the wiper 22 continues the visibility securing operation after the automated driving control is switched to the manual driving control, the processor 33 determines whether or not to terminate the visibility securing operation in accordance with the following operation flowchart at every predetermined period.

The processor 33 determines whether or not a measurement value of a rainfall amount is less than a predetermined rainfall amount threshold value (step S301). When the measurement value of the rainfall is equal to or greater than the predetermined rainfall amount threshold value (step S301—No), the processor 33 determines whether or not to be notified, from the traveling ECU 17, that a vehicle speed of the vehicle 100 is equal to or less than a predetermined speed threshold value (e.g., 5 km/h) and a shift position of the shift lever is the neutral position or the parking position (step S302). When the vehicle speed is higher than the speed threshold value or the shift position is neither the neutral position nor the parking position (step S302—No), the processor 33 causes the wiper 22 to continue the visibility securing operation (step S303). In other words, the processor 33 maintains the state where the wiper 22 operates. On the other hand, when the vehicle speed is equal to or less than the speed threshold value and the shift position is the neutral position or the parking position (step S302—Yes), the processor 33 terminates the visibility securing operation of the wiper 22. Then, the processor 33 controls the wiper 22 in accordance with an operation mode according to a switch position set for the operation switch 16*b* (step S304).

Further, in step S301, when the measurement value of the rainfall amount is less than the predetermined rainfall amount threshold value (step S301—Yes), i.e., when the rainfall amount around the vehicle 100 is a rainfall amount to the extent to which the wiper 22 does not need to operate, the processor 33 terminates the visibility securing operation of the wiper 22. Then, the processor 33 controls the wiper 22 in accordance with an operation mode according to a switch position set for the operation switch 16*b* (step S304). After step S303 or S304, the processor 33 terminates the processing of determining termination of a visibility securing operation. Note that the predetermined rainfall amount threshold value can be, for example, the first rainfall amount threshold value described above.

According to a modification example, the processor 33 may terminate continuation of the visibility securing operation of the wiper 22 after a lapse of a predetermined period from timing at which the automated driving control is switched to the manual driving control. Alternatively, when an operation mode according to a switch position of the operation switch 16*b* by an operation of the operation switch 16*b* by the driver coincides with an operation mode of the wiper 22 under execution, the processor 33 may terminate continuation of the visibility securing operation of the wiper 22.

According to another modification example, when the processor 33 is notified that the ignition switch is turned off from the traveling ECU 17, the processor 33 may terminate continuation of the visibility securing operation of the wiper 22.

The processor 33 may control the wiper 22 in accordance with an operation mode according to a switch position set for the operation switch 16*b* after the continuation of the visibility securing operation is terminated.

Next, details of control of the air-conditioning device 23 will be described.

In the present embodiment, the processor 33 automatically controls whether or not to cause the air-conditioning device 23 to perform the defroster operation on the basis of a temperature inside the vehicle of the vehicle 100 and an temperature outside the vehicle while the traveling ECU 17 performs the automated driving control, similarly to when the mode switching switch of the operation switch 16*c* is set to a switch position to which an AUTO mode is applied. For example, the processor 33 causes the air-conditioning device 23 to perform the defroster operation when a temperature inside the vehicle and a temperature outside the vehicle satisfy a predetermined condition that fogging is likely to occur on the windshield of the vehicle 100. Further, the processor 33 does not cause the air-conditioning device 23 to perform the defroster operation when a temperature inside the vehicle and a temperature outside the vehicle do not satisfy the predetermined condition.

Further, the processor 33 controls the air-conditioning device 23 in accordance with an operation mode according to a switch position of the operation switch 16*c* while the traveling ECU 17 performs the manual driving control.

In the present embodiment, when the processor 33 is notified that the manual driving control is applied from the traveling ECU 17 during execution of the automated driving control, the processor 33 determines whether or not the air-conditioning device 23 performs the defroster operation (i.e., the visibility securing operation) during the previous automated driving control. Then, when the air-conditioning device 23 performs the defroster operation, the processor 33 controls the air-conditioning device 23 in such a way that the air-conditioning device 23 continues the defroster operation regardless of a switch position of the operation switch 16*c*.

In a case where the air-conditioning device 23 continues the defroster operation after switching to the manual driving control, the processor 33 may terminate continuation of the visibility securing operation of the air-conditioning device 23 when a predetermined period elapses from timing of the switching to the manual driving control or when an operation mode according to a switch position of the operation switch 16*c* coincides with an operation mode of the air-conditioning device 23 under execution. The processor 33 may control the air-conditioning device 23 in accordance with the operation mode according to the switch position of the operation switch 16*c* after the continuation of the visibility securing operation is terminated.

Alternatively, in a case where the air-conditioning device 23 continues the defroster operation after switching to the manual driving control, the processor 33 may terminate continuation of the visibility securing operation when a temperature inside the vehicle of the vehicle 100 and a temperature outside the vehicle do not satisfy the predetermined condition that the air-conditioning device 23 is caused to perform the defroster operation.

Alternatively, in a case where the air-conditioning device 23 continues the defroster operation after switching to the manual driving control, the processor 33 may terminate continuation of the defroster operation of the air-conditioning device 23 when the processor 33 is notified, from the traveling ECU 17, that a vehicle speed of the vehicle 100 is equal to or less than a predetermined speed threshold value (e.g., 5 km/h) and a shift position of the shift lever is the neutral position or the parking position. Alternatively, when the processor 33 is notified that the ignition switch is turned off from the traveling ECU 17, the processor 33 may terminate continuation of the defroster operation of the air-conditioning device 23.

When an operation mode according to the switch position of the operation switches 16a to 16c (set operation mode) and an operation mode of corresponding vehicle-mounted equipment under execution (execution operation mode) are different, the processor 33 generates a mismatch notification signal representing that the set operation mode and the execution operation mode of the corresponding vehicle-mounted equipment are different. Then, the processor 33 outputs the mismatch notification signal to the traveling ECU 17 via the communication interface 31. For example, when the processor 33 is notified that a switch position is changed to the OFF position or the TAIL position relating to the headlight 21 from the operation switch 16a by an operation of the driver during execution of the automated driving control, the processor 33 outputs a mismatch notification signal relating to the headlight 21 to the traveling ECU 17 via the communication interface 31. Then, when receiving the mismatch notification signal relating to the headlight 21, the traveling ECU 17 causes the HMI 14 to display a message that "during light AUTO control at present". Further, when the processor 33 is notified that a switch position is changed to the OFF position or the INT position relating to the wiper 22 from the operation switch 16b by an operation of the driver during execution of the automated driving control, the processor 33 outputs a mismatch notification signal relating to the wiper 22 to the traveling ECU 17 via the communication interface 31. Then, when receiving the mismatch notification signal relating to the wiper 22, the traveling ECU 17 causes the HMI 14 to display a message that "during wiper AUTO control at present".

Further, when any vehicle-mounted equipment continues the visibility securing operation after switching to the manual driving control and a set operation mode of the vehicle-mounted equipment is not an operation mode corresponding to the visibility securing operation, the processor 33 generates a continuation notification signal representing that the visibility securing operation continues. Then, the processor 33 outputs the continuation notification signal to the traveling ECU 17 via the communication interface 31. For example, when a switch position of the operation switch 16a is the OFF position or the TAIL position and the headlight 21 is ON during the previous automated driving control, the processor 33 outputs a continuation notification signal relating to the headlight 21 to the traveling ECU 17 via the communication interface 31. Then, when receiving the continuation notification signal relating to the headlight 21, the traveling ECU 17 causes the HMI 14 to display a message that "AUTO control continues". Further, when a switch position of the operation switch 16b is the OFF position or the INT position relating to the wiper 22 and the wiper 22 performs an operation corresponding to the Hi position or the Lo position during the previous automated driving control, the processor 33 outputs a continuation notification signal relating to the wiper 22 to the traveling ECU 17 via the communication interface 31. Then, when receiving the continuation notification signal relating to the wiper 22, the traveling ECU 17 causes the HMI 14 to display a message that "wiper AUTO control continues".

Furthermore, when the processor 33 terminates continuation of the visibility securing operation of any vehicle-mounted equipment, the processor 33 generates a termination notification signal representing that the continuation of the visibility securing operation is terminated, and outputs the termination notification signal to the traveling ECU 17 via the communication interface 31. For example, when continuation of the visibility securing operation of the headlight 21 is terminated, the processor 33 outputs a termination notification signal relating to the headlight 21 to the traveling ECU 17 via the communication interface 31. Then, when receiving the termination notification signal relating to the headlight 21, the traveling ECU 17 causes the HMI 14 to display a message that "AUTO control is terminated". Further, when continuation of the visibility securing operation of the wiper 22 is terminated, the processor 33 outputs a termination notification signal relating to the wiper 22 to the traveling ECU 17 via the communication interface 31. Then, when receiving the termination notification signal relating to the wiper 22, the traveling ECU 17 causes the HMI 14 to display a message that "wiper AUTO control is terminated".

Still further, in a case where a switch position of the operation switch 16a is the OFF position or the TAIL position when the manual driving control is switched to the automated driving control, the processor 33 may output a start notification signal representing a start of automatic control relating to the headlight 21 to the traveling ECU 17 via the communication interface 31. Then, when receiving the start notification signal relating to the headlight 21, the traveling ECU 17 may cause the HMI 14 to display a message that "light AUTO control has started". Further, in a case where a switch position of the operation switch 16b is the OFF position or the INT position when the manual driving control is switched to the automated driving control, the processor 33 may output a start notification signal representing a start of automatic control relating to the wiper 22 to the traveling ECU 17 via the communication interface 31. Then, when receiving the start notification signal relating to the wiper 22, the traveling ECU 17 causes the HMI 14 to display a message that "wiper AUTO control has started".

As described above, the vehicle-mounted equipment control device is installed in a vehicle to which the automated driving control is applicable, and controls vehicle-mounted equipment such as a headlight, a wiper, and an air-conditioning device. Then, when the automated driving control is switched to the manual driving control in a case where the vehicle-mounted equipment performs the visibility securing operation during the previous automated driving control, the vehicle-mounted equipment control device causes the vehicle-mounted equipment to continue the visibility securing operation regardless of an operation mode specified by an operation switch that operates the vehicle-mounted equipment even when switching to the manual driving control. Thus, the vehicle-mounted equipment control device can prevent difficulty in visually recognizing surroundings of a vehicle by a driver when the automated driving control is switched to the manual driving control.

According to a modification example, during execution of the automated driving control, when the headlight 21 continues the visibility securing operation after the automated driving control is switched to the manual driving control or when a switch position of the operation switch 16a is the AUTO position, the processor 33 of the BODY-ECU 18 may control the headlight 21 according to a lighting situation of a headlight of another vehicle around the vehicle 100.

In this case, for example, by inputting an image acquired from the camera 11 to a classifier that has been trained in such a way as to detect an oncoming vehicle and a headlight of the oncoming vehicle represented in an image, the processor 33 detects an oncoming vehicle around the vehicle 100 and a headlight thereof from the input image. Then, the processor 33 calculates a luminance average value of a region representing the detected headlight for each oncoming vehicle represented in the image, and determines that the headlight of the oncoming vehicle is ON when the luminance average value is equal to or greater than a predetermined luminance threshold value. Alternatively, the processor 33 may calculate, for each oncoming vehicle represented in the image, an absolute value of a difference between a luminance average value of a region representing the detected headlight and a luminance average value of a region around the region representing the detected headlight, and determine that the headlight of the oncoming vehicle is ON when the absolute value of the difference is equal to or greater than a predetermined difference threshold value. Alternatively, the classifier may have been trained in such a way as to also determine whether or not a headlight is ON. Note that the processor 33 can use, as the classifier, a so-called deep neural network having a convolutional neural network architecture, for example. For example, the classifier may have been trained in accordance with a predetermined supervised learning technique such as error back propagation by using a plurality of supervised images representing that a headlight of a vehicle turns on and a plurality of supervised images representing that a headlight of a vehicle turns off. Further, a parameter set for identifying the classifier, such as a weighting factor of an individual node in each layer, may be previously stored in the memory 32.

The processor 33 calculates a ratio of the number of oncoming vehicles whose headlight is ON to a total number of oncoming vehicles detected for each of a series of images acquired in the latest certain period (e.g., 1 to 10 seconds). Then, when the ratio is higher than a predetermined proportion (e.g., 0.4 to 0.6), the processor 33 controls the headlight 21 in such a way as to turn on the headlight 21. On the other hand, when the ratio is equal to or less than the predetermined proportion, the processor 33 controls the headlight 21 in such a way as to turn off the headlight 21.

Furthermore, in a case where the headlight 21 continues the visibility securing operation after the automated driving control is switched to the manual driving control, when the ratio of the number of oncoming vehicles whose headlight is ON to a total number of detected oncoming vehicles is equal to or less than the predetermined proportion, the processor 33 may terminate continuation of the visibility securing operation of the headlight 21. Subsequently, the processor 33 may control the headlight 21 in accordance with an operation mode according to a switch position of the operation switch 16*a*.

Similarly, during execution of the automated driving control, when the wiper 22 continues the visibility securing operation after the automated driving control is switched to the manual driving control or when a switch position of the operation switch 16*b* is the AUTO position, the processor 33 may control the wiper 22 in accordance with an operation situation of a wiper of another vehicle around the vehicle 100.

In this case, for example, by inputting an image acquired from the camera 11 to a classifier that has been trained in such a way as to detect an oncoming vehicle and a wiper of the oncoming vehicle represented in an image, the processor 33 detects an oncoming vehicle around the vehicle 100 and a wiper thereof from the input image. Then, the processor 33 calculates an angle of the detected wiper with respect to a horizontal direction for each oncoming vehicle represented in the image, and determines that the wiper of the oncoming vehicle operates when the angle is equal to or greater than a predetermined angle threshold value. Alternatively, the classifier may have been trained in such a way as to also determine whether or not a wiper is operating. In this case also, the processor 33 can use, as the classifier, a so-called deep neural network having a convolutional neural network architecture, for example. Note that the classifier may have been trained in accordance with a predetermined supervised learning technique such as error back propagation by using a plurality of supervised images representing a vehicle with a wiper during operation and a plurality of supervised images representing a vehicle with a wiper during stop. Further, a parameter set for identifying the classifier, such as a weighting factor of an individual node in each layer, may be previously stored in the memory 32.

The processor 33 calculates a ratio of the number of oncoming vehicles whose wiper is operating to a total number of oncoming vehicles detected from each of a series of images acquired in the latest certain period (e.g., 1 to 10 seconds). Then, when the ratio is higher than a predetermined proportion (e.g., 0.4 to 0.6), the processor 33 controls the wiper 22 in such a way as to operate the wiper 22 at a predetermined speed (e.g., a speed corresponding to the Lo position). On the other hand, when the ratio is equal to or less than the predetermined proportion, the processor 33 controls the wiper 22 in such a way as to stop operating the wiper 22. Further, the processor 33 may control the wiper 22 in such a way that an operation speed of the wiper 22 becomes faster as the ratio is increased. In this case, for example, a table representing a relationship between the ratio of the number of oncoming vehicles with a wiper operating to a total number of detected oncoming vehicles and the operation speed of the wiper 22 may be previously stored in the memory 32, and the processor 33 may determine the operation speed of the wiper by referring to the table.

Furthermore, in a case where the wiper 22 continues the visibility securing operation after the automated driving control is switched to the manual driving control, when the ratio of the number of vehicles with a wiper operating to a total number of detected vehicles is equal to or less than the predetermined proportion, the processor 33 terminates continuation of the visibility securing operation of the wiper 22. Subsequently, the processor 33 may control the wiper 22 in accordance with an operation mode according to a switch position of the operation switch 16*b*.

According to another modification example, the BODY-ECU 18 may transmit a signal (e.g., a continuation notification signal, a mismatch notification signal, and the like) for notifying a driver to the HMI 14 without passing through the traveling ECU 17, and may display a message according to the signal on the HMI 14.

According to still another modification example, a BODY-ECU may be separately provided for each piece of vehicle-mounted equipment. For example, a BODY-ECU that controls the headlight 21, a BODY-ECU that controls the wiper 22, and a BODY-ECU that controls the air-conditioning device 23 may be separately provided. In this case also, each of the BODY-ECUs may have a configuration similar to that of the BODY-ECU 18 according to the embodiment or the modification example described above, and may control corresponding vehicle-mounted equipment according to the embodiment or the modification example described above.

As described above, those skilled in the art may make various changes in conformity to an embodiment within the scope of the present disclosure.

What is claimed is:

1. A vehicle-mounted equipment control device, comprising:
a controller configured to cause equipment of a wiper to:
continue a visual securing operation for securing visibility of a driver of a vehicle even after driving control of the vehicle is switched from automated driving control to manual driving control regardless of an operation mode of the equipment specified by an operation switch for setting an operation of the equipment when an operation mode executed by the equipment immediately before driving control of the vehicle is switched from automated driving control to manual driving control is an operation mode corresponding to the visual securing operation;
detect an oncoming vehicle and an operation situation of a wiper of the oncoming vehicle from each of a plurality of time-series images acquired by a camera installed in the vehicle in a latest certain period after driving control of the vehicle is switched from automated driving control to manual driving control; and
change an operation mode of the wiper to an operation mode specified by the operation switch when a ratio of the number of oncoming vehicles whose wiper is operating to a total number of detected oncoming vehicles in the certain period is equal to or less than a predetermined proportion.

2. The vehicle-mounted equipment control device according to claim 1, wherein the controller changes an operation mode of the wiper to an operation mode specified by the operation switch when a speed of the vehicle measured by a speed sensor installed in the vehicle is equal to or less than a predetermined speed and a position of a shift lever of the vehicle is a position in which power of the vehicle is not transmitted to a wheel of the vehicle or when a rainfall amount measured by a rain sensor is equal to or less than a predetermined threshold value after driving control of the vehicle is switched from automated driving control to manual driving control.

* * * * *